No. 685,906. Patented Nov. 5, 1901.
E. BROWN.
COMBINED MILK DIPPER AND MEASURE.
(Application filed Mar. 21, 1901.)

(No Model.)

WITNESSES:
Geo. Gelatt.
W. G. Moran.

INVENTOR
Eugene Brown
BY D. B. Replogle
ATTORNEY

THE NORRIS PETERS CO., PHOTO-LITHO., WASHINGTON, D. C.

UNITED STATES PATENT OFFICE.

EUGENE BROWN, OF SCRANTON, PENNSYLVANIA.

COMBINED MILK DIPPER AND MEASURE.

SPECIFICATION forming part of Letters Patent No. 685,906, dated November 5, 1901.

Application filed March 21, 1901. Serial No. 52,194. (No model.)

*To all whom it may concern:*

Be it known that I, EUGENE BROWN, a citizen of the United States, residing at Scranton, in the county of Lackawanna and State of Pennsylvania, have invented certain new and useful Improvements in a Combination Milk Dipper and Measure, of which the following is a specification, reference being had therein to the accompanying drawings.

This invention relates to milk dippers and measures such as are used for measuring and dispensing milk; and the objects of the invention are to provide a measuring milk-dipper with a separable handle and suitable for combination with a gage or milk rule, such as are used for reckoning the milk by the depth in the can, to make a milk-dipper convertible into an ordinary measure, and other objects, as are set forth in the claim.

To these ends the invention consists of the construction, arrangement, and combination of the parts, as herein illustrated and specified, in which—

Figure 3:
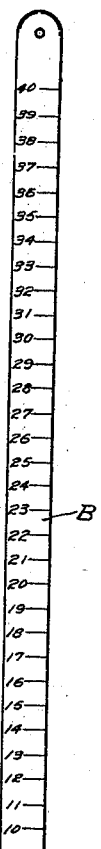
Figure 3:
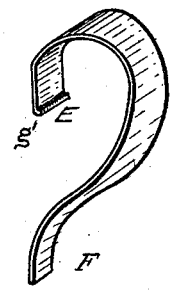
Figure 4:
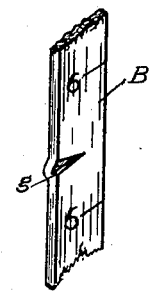
Figure 1:
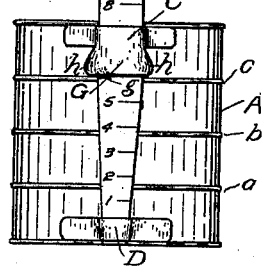
Figure 2:
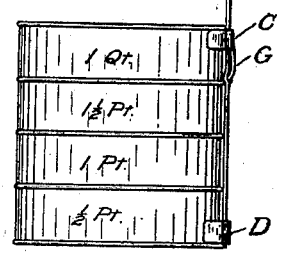

Figure 1 is a rear side elevation of one of my dippers when the milk gage or rule is connected therewith. Fig. 2 is a view of the same, taken at right angles to that of Fig. 1. Fig. 3 is a perspective view of a common handle adapted to be attached to the measuring-cup when the gage or rule is removed. Fig. 4 is a detail view of a section of the milk-rule, showing how it is notched to adapt it to be locked to the measuring-cup in my device.

Similar letters of reference denote like and corresponding parts throughout the several views.

In the drawings, A designates the receptacle or dipper part of the device, which is usually designed to hold exactly one quart, but may be of any desired size. The illustration shows one adapted to hold one quart and provided with beads $a$ $b$ $c$, marking the several measurements one-half pint, one pint, and one and one-half pints, respectively. These marks are, of course, of utility whether the long measuring-rule is attached as a handle or whether the common form of handle shown in Fig. 3 is used.

B designates an ordinary milk rule or gage, which may be constructed from a flat strip of metal and is provided with one or more graduated scales, the one in the illustration showing graduations suitable for measuring milk in a can holding forty quarts. Scales may be placed on both sides of the handle as well as several scales on either side, it not being deemed necessary to show them in the illustrations. It is necessary, however, that the graduations on the handle run in numerical order upward, commencing below, and that the lower end of the rule be constructed to fit into the lugs C and D, which are secured to the measuring-cup. The lower lug D may have sloping sides, so that either handle may be held more securely by being forced into it to the full depth. The lugs C and D are of course adapted to receive the shanks E and F, respectively, of the common handle, (shown in Fig. 3,) and the lug C has integrally made with it a spring-catch G to engage with the notch $g$ on the milk-rule when the milk-rule is used for a handle and with the hook $g'$ on the ordinary handle when it is used. The catch G is provided at opposite sides with lugs or extensions $h$ $h$, by means of which the catch may be disengaged for the purpose of removing the handle from the dipper.

The foregoing specifies a practical construction of my invention. I do not wish, however, to be confined to the exact construction described and illustrated, as many of the details may be varied without departing from the general spirit of my invention.

In the use of the device when ordinary measuring is to be done the handle shown in Fig. 3 is substituted for the milk-rule, as shown in Fig. 1, by simply lifting the catch G out of engagement with the notch $g$ by means of the thumb-nail under the lug $h$. When the lug is thus lifted, the long handle may be easily withdrawn and the small handle substituted. As venders of milk frequently desire to know the amount of the remaining contents of the can from which they are selling, the combination with the ordinary rule used for the purpose of a dipper separable from a common handle as I have here devised is of great convenience and utility, and I believe my invention is an advance in the art to which it relates.

What I therefore claim, and desire to secure by Letters Patent, is—

The herein-described milk-measuring device comprising a milk-measuring receptacle, and a common handle readily separable therefrom and attachable thereto, together with a milk-measuring rule having a notch, and adapted to be inserted in place of the handle aforesaid, and secured therein by means of a catch engaging with the notch aforesaid, and readily detachable therefrom, substantially as and for the purpose specified.

In testimony whereof I affix my signature in presence of two witnesses.

EUGENE BROWN.

Witnesses:
 EDITH BENJAMIN,
 D. G. MORAN.